United States Patent
Yamamoto

[19]
[11] Patent Number: 5,928,364
[45] Date of Patent: Jul. 27, 1999

[54] SECRET DATA STORAGE DEVICE, SECRET DATA READING METHOD, AND CONTROL PROGRAM STORING MEDIUM

[75] Inventor: Hiroshi Yamamoto, Chofu, Japan

[73] Assignee: Casio Computer Co., Ltd., Tokyo, Japan

[21] Appl. No.: 08/875,586

[22] PCT Filed: Nov. 27, 1996

[86] PCT No.: PCT/JP96/03463

§ 371 Date: Jul. 14, 1997

§ 102(e) Date: Jul. 14, 1997

[87] PCT Pub. No.: WO97/20265

PCT Pub. Date: Jun. 5, 1997

[30] Foreign Application Priority Data

Nov. 30, 1995 [JP] Japan .................................. 7-312229

[51] Int. Cl.⁶ .................................................. G06F 15/00
[52] U.S. Cl. .......................................... 713/202; 713/201
[58] Field of Search .............................. 395/186, 187.01, 395/188.01, 200.59; 380/4, 23, 24, 25; 340/825.31, 825.34

[56] References Cited

U.S. PATENT DOCUMENTS

| | | | |
|---|---|---|---|
| 4,317,957 | 3/1982 | Sendrow | 340/825.34 |
| 5,163,091 | 11/1992 | Graziano et al. | 380/25 |
| 5,191,613 | 3/1993 | Graziano et al. | 380/25 |
| 5,465,084 | 11/1995 | Cottrell | 340/825.31 |
| 5,469,564 | 11/1995 | Junya | 395/188.01 |
| 5,475,377 | 12/1995 | Lee | 340/825.34 |
| 5,485,519 | 1/1996 | Weiss | 380/23 |
| 5,565,857 | 10/1996 | Lee | 340/825.34 |
| 5,623,637 | 4/1997 | Jones et al. | 380/25 |
| 5,673,373 | 9/1997 | Nosaki et al. | 395/114 |

FOREIGN PATENT DOCUMENTS

| | | |
|---|---|---|
| 0 402 961 | 12/1990 | European Pat. Off. . |
| WO 93/11511 | 6/1993 | WIPO . |

OTHER PUBLICATIONS

Derwent Publications Ltd., London, England; Database WPI; Section E1, Week 9207, Class T01, AN 92–055712.

*Primary Examiner*—Robert W. Beausoliel, Jr.
*Assistant Examiner*—Pierre E. Elisca
*Attorney, Agent, or Firm*—Frishauf, Holtz, Goodman, Langer & Chick, P.C.

[57] ABSTRACT

This invention relates a secret data storage device capable of setting password data which is easy for a specific user to memorize but is difficult for others to understand. A registration password data item composed of an arbitrary hieroglyphic data item or a combination of an arbitrary hieroglyphic data item and the color specifying data corresponding to the hieroglyphic is entered by selectively operating the hieroglyphic key 12b and color key 12d in the key input section 12. Similarly, using the color specifying data item and the like, a collation password data item is inputted. Then, it is determined whether or not the registration password data item coincides with the collation password data item entered this time. When it has been determined that they coincide with each other, the secret data stored in the secret data memory 17d is accessed and the accessed data appears on the display section 19.

10 Claims, 7 Drawing Sheets

PASSWORD STORING MEMORY — 16

| REGISTRATION PASSWORD DATA | | |
|---|---|---|
| NO. | KIND OF HIEROGLYPHIC | COLOR SPECIFYING DATA |
| 1 | FOX | GREEN |
| 2 | RACCOON DOG | RED |
| 3 | — | — |
| n | — | — |

FIG.4

PASSWORD EDIT MEMORY — 15

| COLLATION PASSWORD DATA | | |
|---|---|---|
| NO. | KIND OF HIEROGLYPHIC | COLOR SPECIFYING DATA |
| 1 | FOX | GREEN |
| 2 | RACCOON DOG | RED |
| 3 | — | — |
| n | — | — |

FIG.5

PASSWORD (HIEROGLYPHIC) ?

E1   E3

CURSOR

PASSWORD (COLOR) ?

| RED | BULE | GREEN | YELLOW | PINK |

CA

E1   E3

↑     ↑
GREEN  RED

COLOR

REGISTRATION ?

GREEN FOX

RED RACCOON DOG

REGISTRATION

5,928,364

SECRET DATA STORAGE DEVICE, SECRET DATA READING METHOD, AND CONTROL PROGRAM STORING MEDIUM

TECHNICAL FIELD

This invention relates to a secret data storage device that stores various data items, such as addresses, telephone numbers, schedules, and memos, a method of reading secret data, and a recording medium for control programs.

BACKGROUND ART

One known secret data storage device has the secret function which stores the data unwilling to be known to others except for particular users and the important data as secret data and enables the stored secret data to be accessed and read, only when the previously entered user's unique registration password coincides with the user-inputted collation password.

To prevent others from seeing the secret data easily, password data difficult for others to understand is set. In setting the password data, a combination of numbers into a four-digit number or a combination of characters or symbols has been used.

Setting password data in the form of such a combination makes it very difficult for the user to memorize and input the data.

The present invention has been considered to solve the problem with the prior art.

Accordingly, the object of the present invention is to provide a secret data storage device capable of accessing the secret data using a password easy for particular users to memorize but difficult for others to understand, a method of reading the secret data, and a storing medium for control programs.

DISCLOSURE OF THE INVENTION

To accomplish the foregoing object, a secret data storage device of the present invention comprises: data storage means for storing secret data wanted to be secret; first password data input means for inputting a single color data item or a combination of a plurality of color data items as registration password data; password data storage means for storing the registration password data inputted from the first password data input means; second password data input means for inputting a single color data item or a combination of a plurality of color data items as collation password data; coincidence determining means for determining whether or not the collation password data inputted from the second password data input means coincides with the registration password data stored in the password data storage means; and control means for performing control so as to enable access to the secret data stored in the data storage means when the coincidence determining means has determined that they coincide with each other.

With the present invention, the registration and collation password data items are inputted using the color data associated with an image of a color easy for the user to memorize. When these password data items coincide with each other, this enables access to the secret data area.

Furthermore, the secret data storage device of the present invention further comprises: specifying means for specifying any one of a plurality of hieroglyphics; and display means for providing color display of the hieroglyphic specified by the specifying means using a color corresponding to the color data inputted as the registration password data or the collation password data.

With the present invention, it is possible to provide color display of the hieroglyphic specified by the user using the color corresponding to the color data set by the registration password data and the collation password data.

BRIEF DESCRIPTION OF THE DRAWINGS

FIG. 4 shows an example of storage in the password storing memory;

FIG. 5 shows an example of storage in the password edit memory;

BEST MODE OF CARRYING OUT THE INVENTION

Hereinafter, referring to the accompanying drawings, an embodiment of the present invention will be explained.

Figure 1:
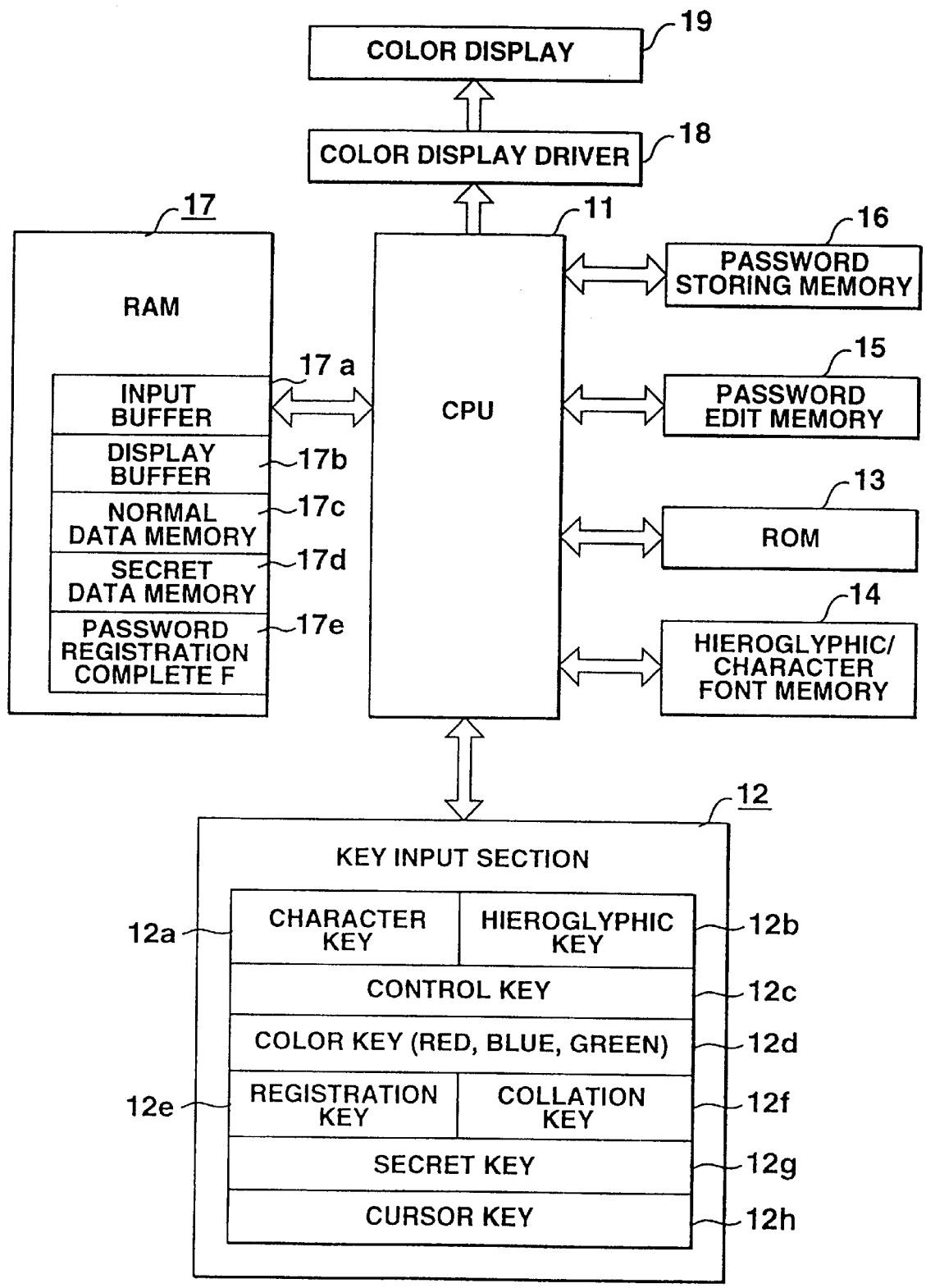
FIG. 1 is a block diagram of the configuration of an electronic circuit according to the present invention.

FIG. 1 is a block diagram of the configuration of an electronic circuit in a case where the present invention has been applied to an electronic notebook.

The electronic notebook is provided with a control section (CPU) 11 constituting a computer.

In response to the key operation signal from a key input section 12, the control section (CPU) 11 starts the system program previously stored in a ROM 13 and controls the operation of each section of the circuit.

Connected to the control section (CPU) 11 are the key input section 12, the ROM 13, a hieroglyphic/character font memory 14, a password edit memory 15, a password storing memory 16, and a RAM 17. A liquid-crystal color display 19 is also connected to the control section 11 via a color display driver 18.

The key input section 12 includes character keys 12a including key groups of hiragana, English, numeral, symbol, etc. for entering various types of data items, "hieroglyphic" keys 12b used to set control to the hieroglyphic, or the icon input mode, control keys 12c having key groups used to specify various functions, including the setting of kana-kanji conversion, insertion, deletion, and operation mode, color keys 12d for specifying colors, red, blue, and green, a "registration" key 12e used to specify data registration, a "collation" key 12f used to specify data collation, a "secret" key 12g used to set the secret mode, and a cursor key 12h used to move the cursor on the screen or select a data item.

Figure 2:
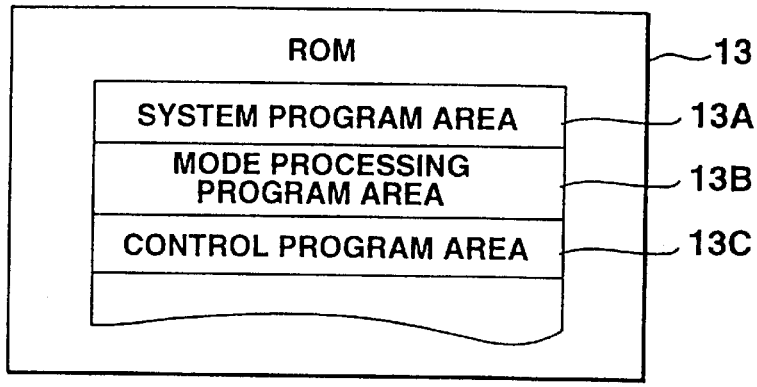
FIG. 2 illustrates an example of storage in the ROM.

As shown in FIG. 2, the ROM 13 includes a large number of sub-program areas, including a system program area 13A in which a system program for controlling the operation of the entire electronic notebook has been stored, a mode processing program area 13B in which a mode processing program for controlling processes of various operation modes such as telephone directory mode, memo mode, and schedule mode has been stored, and a control program area 13C in which a control program for registering and collating password data items has been stored.

Figure 3:
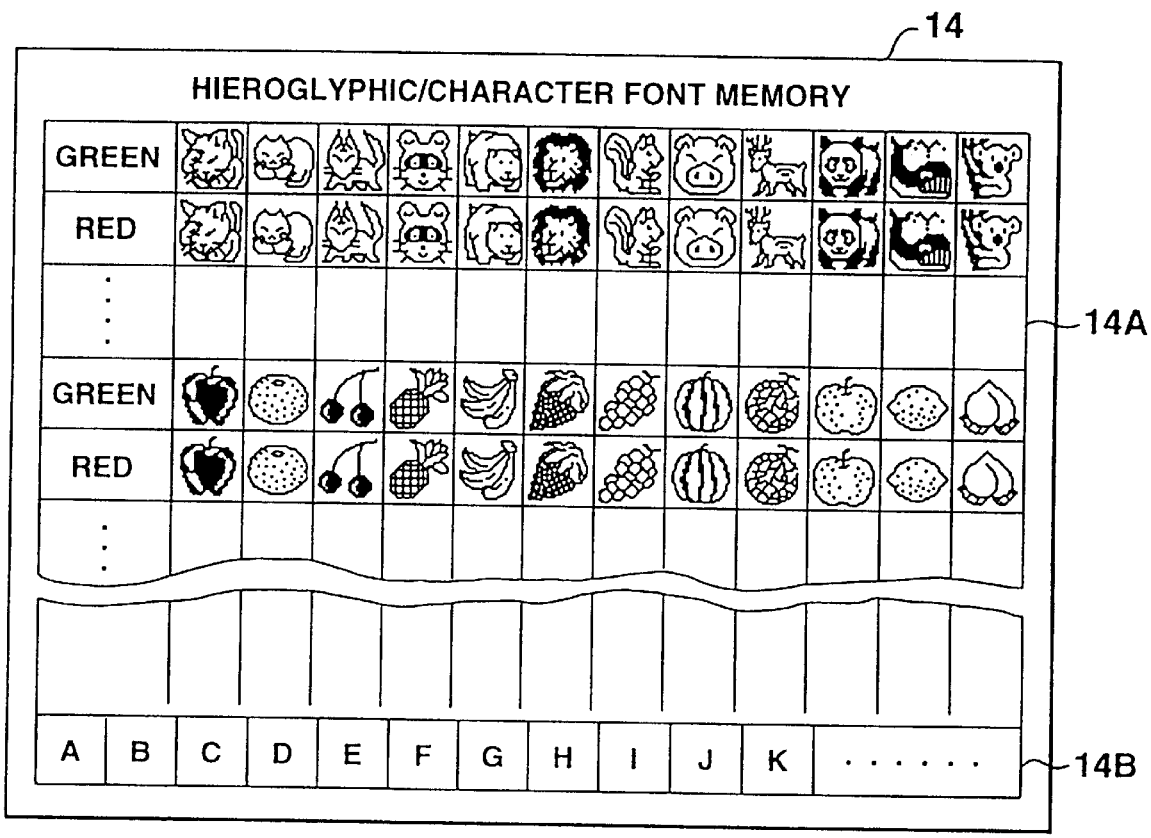
FIG. 3 illustrate an example of storage in the hieroglyphic/character font memory.

As shown in FIG. 3, the hieroglyphic/character font memory 14 includes a hieroglyphic font area 14A in which a large number of hieroglyphic font patterns of various genres, including animals, food, vehicles, and seasons, have been stored, and a character font area 14B in which all of the character font patterns which can be entered from the character keys 12a in the key input section 12 have been stored. The code data indicating the character or hieroglyphic entered from the keys are converted by the hieroglyphic/character font memory 14 into the corresponding font pattern for the hieroglyphic or character and are outputted for display.

In the secret mode, the password data (the data composed of a combination of the type of hieroglyphic and the color data assigned to the hieroglyphic) entered from the key input section 12 is written sequentially into the password data edit memory 15 as collation password data as shown in FIG. 5.

Figure 6:
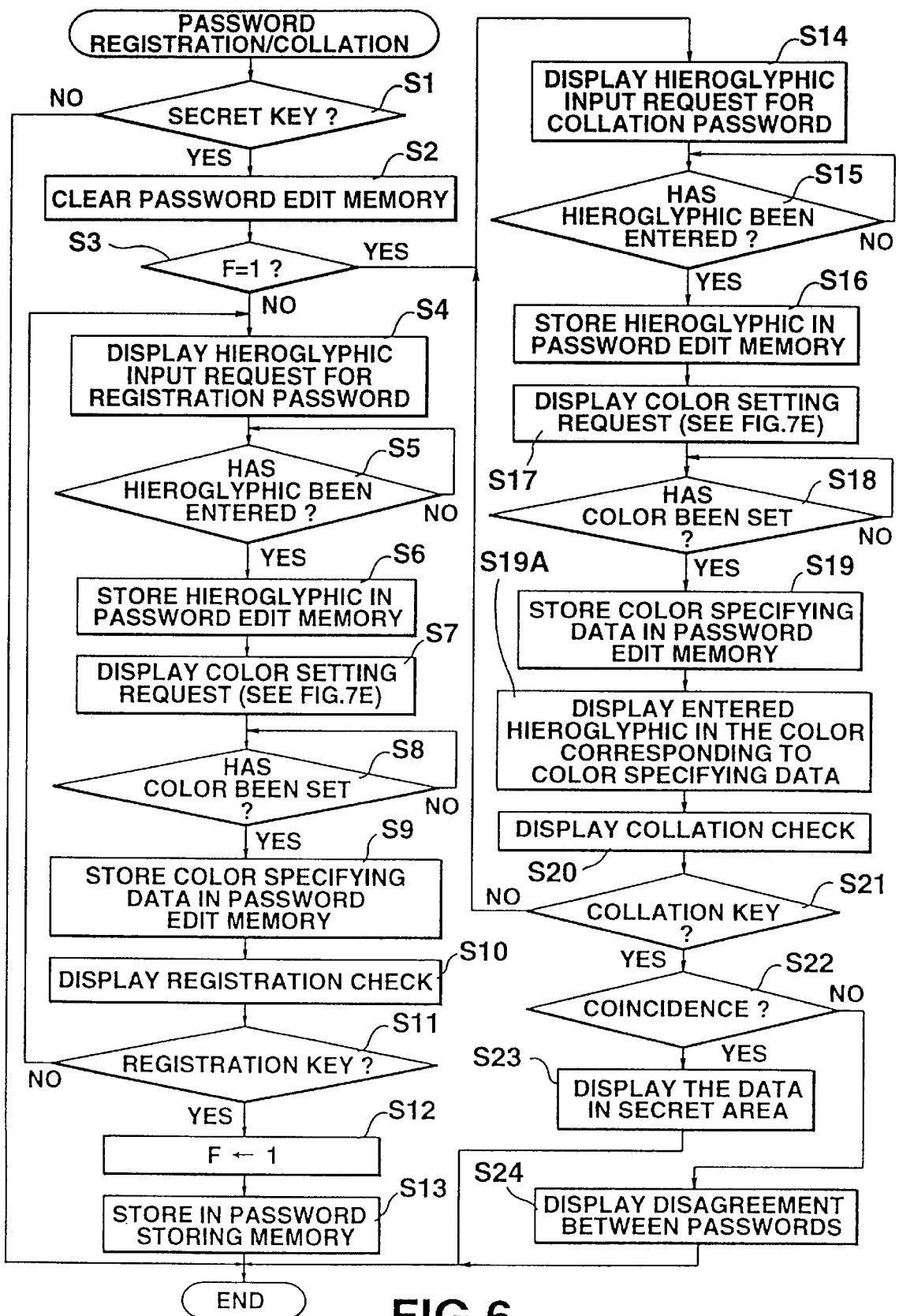
FIG. 6 is a flowchart for the password registration/collation process.

The password data edited at the password data edit memory 15 is transferred in response to the operation of the "registration" key 12e in the key input section 12 and is stored in the password data storing memory 16 as registration password data as shown in FIG. 6.

The RAM 17 includes an input buffer 17a, a display buffer 17b, a normally accessible data memory 17c, a secret data memory 17d, and a registration flag register 17e.

The key input data is stored temporarily in the input buffer 17a.

The display data to be displayed on the liquid-crystal color display 19 is stored in the display buffer 17b in bit map form.

The normal data items that need not be kept secret, including addresses, telephone numbers, schedules, and memos that are entered and registered from the keys in various notebook mode, have been stored in the normally accessible data memory 17c.

The secret data items which should be kept secret, including addresses, telephone numbers, schedules, and memos which can be accessed only when the password data items coincide with each other in the secret mode, are stored in the secret data memory 17d.

In the registration complete flag register 17e, a password registration complete flag F indicating that the user's unique password data has been registered in the password storing memory 16 is set.

The display data stored in the display buffer 17b is developed as color display data according to the operation of the color key 12d in the key input section 12 and appears on the liquid-crystal color display 19 via a color display driver 18.

Next, the operation of the embodiment will be explained.

FIG. 6 is a flowchart for the password data registration/collation process in the CPU 11.

FIGS. 7A to 9 illustrate display examples produced by the password data registration/collation process.

<Password Registration Process>

First, when the user's unique password data is registered, the "secret" key 12g in the key input section 12 is operated (step S1). Then, the contents of the password data edit memory 15 are cleared (step S2) and it is determined whether or not the password registration complete flag F has been set to "1" in the registration complete flag register 17e in the RAM 17, that is, whether or not the password data has been registered already in the password storing memory 16 (step S1→S2, S3).

Figure 7A:
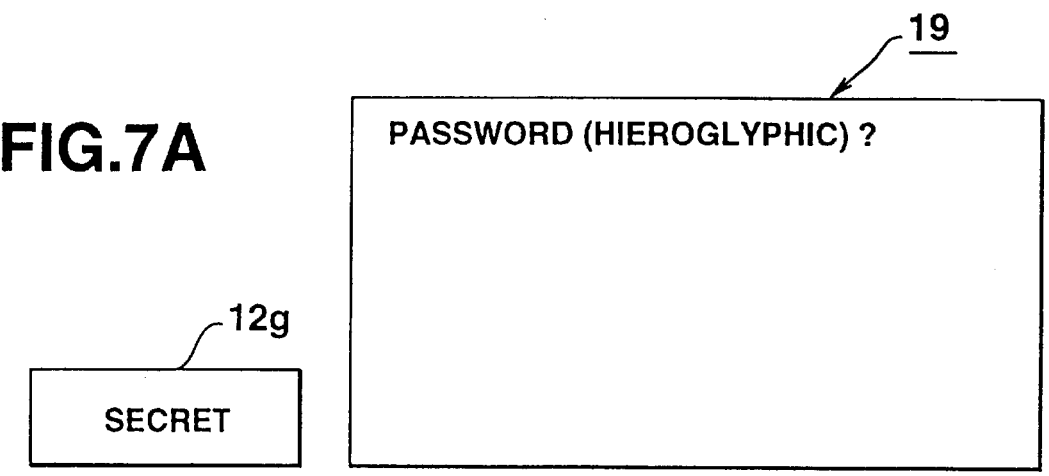
FIGS. 7A to 7F illustrate displaying states produced by the password data registration process.

When it is determined in step S3 that the password registration complete flag F has not been set to "1," or that the password data has not been registered in the password storing memory 16, "PASSWORD (hieroglyphic)?", a hieroglyphic input request message for registration password data, appears on the color display 19 as shown in FIG. 7A (step S3→S4).

Figure 7B:
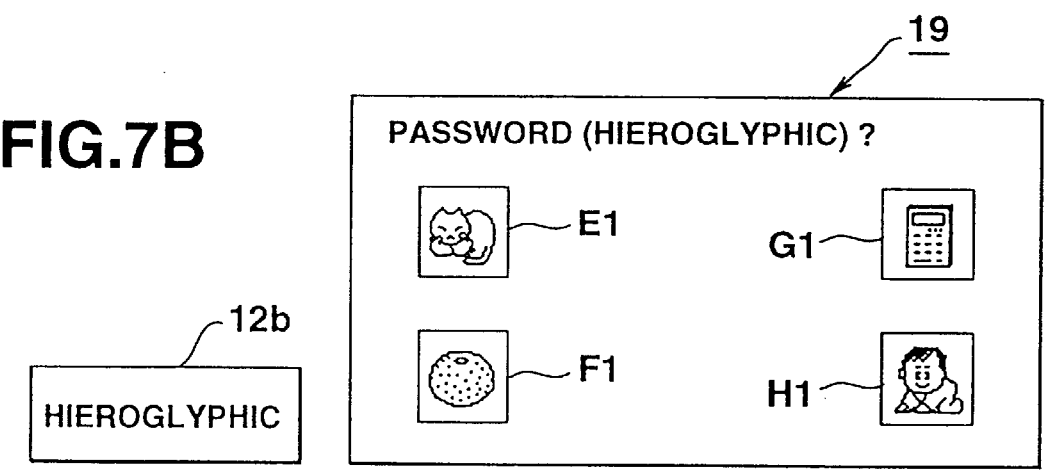
Figure 7C:
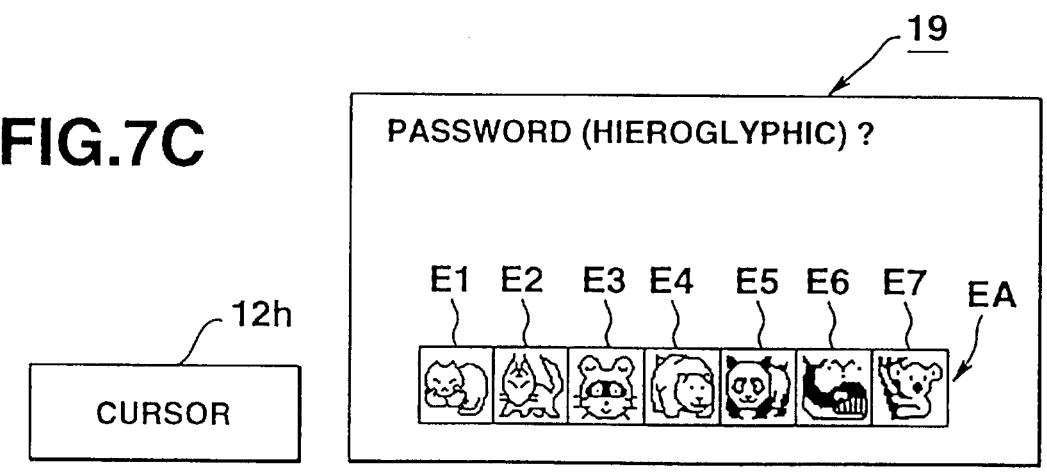
Figure 7D:
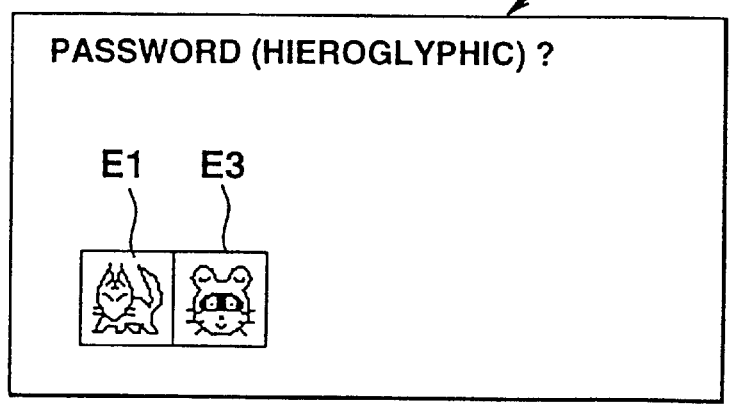
Figure 7D:
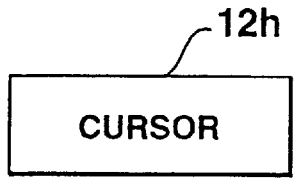
Figure 7E:
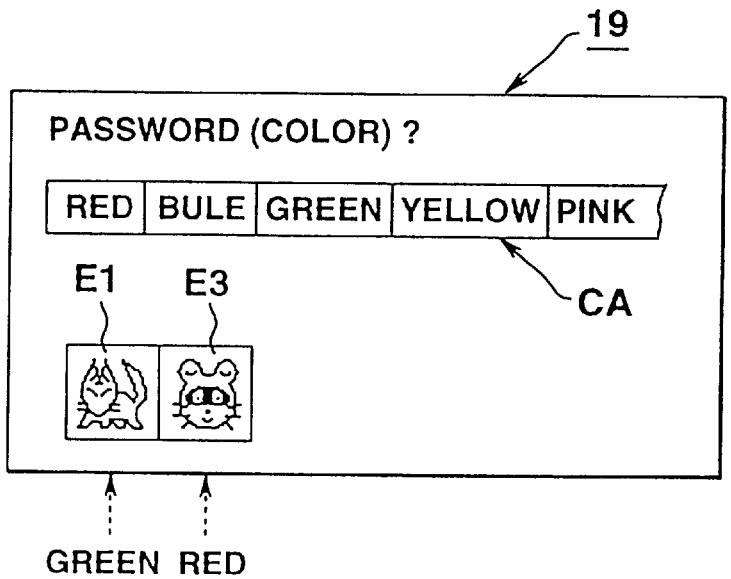
Figure 7E:
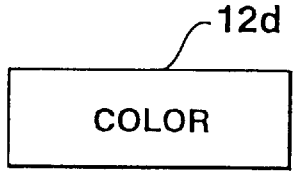

Then, as shown in FIG. 7B, when the user operates the "hieroglyphic" key 12b in the key input section 12, a hieroglyphic menu screen D1, F1, G1, H1, including "animals," "food," "vehicles," and "seasons" representing hieroglyphic genres, appears on the color display 19.

With the hieroglyphic menu screen E1, F1, G1, H1 being displayed, for example, the genre of "animals" is selected by operating the cursor key, 12h, the hieroglyphic font patterns depicting a large number of animals previously stored in the hieroglyphic/character font memory 14 are read out and appear in list form on the color display 19.

Next, with the list of animal hieroglyphics EA being displayed, when arbitrary animal hieroglyphics E1, E3 are specified by operating the cursor key 12h, the specified animal hieroglyphics E1, E3 not only appear on the color display 19 but also are stored in the password edit memory 15 (step S5→S6).

When the hieroglyphics have been selected and entered, "PASSWORD (color)?," a color setting request message for the entered hieroglyphic, appears on the color display 19 (step S7). At the same time, a color list display section CA is displayed.

Then, when from the color list display section CA, the user selectively sets a color specifying data item for the animal hieroglyphic entered by operating the corresponding color key (e.g., red, blue, or green) 12d in the key input section 12, the set color specifying data item is added to the animal hieroglyphic data stored in the password edit memory 15 and the resulting data is stored (step S8→S9).

Then, "REGISTRATION?," a password data registration verify message, appears on the color display 19 (step S10).

When a specific period time has elapsed without the "registration" key 12e in the key input section 12 being operated, control returns to the processes in step S4 and later steps, a combination of the second hieroglyphic data and its color specifying data is set as registration password data (step S11→S4 to S10).

Specifically, in the processes of setting registration password data in steps S4 to S11, for example, "fox" and "green" are set for the "first hieroglyphic" and for the "color specifying data" corresponding to the hieroglyphic, respectively. After this, "raccoon" and "red" are set for the "second hieroglyphic" and for the "color specifying data" corresponding to the hieroglyphic, respectively. On the basis of these color specifying data items, the image data items for the set "green fox hieroglyphic" and "red raccoon dog hieroglyphic" are read from a large number of hieroglyphics of various colors stored in the hieroglyphic/character font memory 14 shown in FIG. 3. The read-out image data items of the "green fox hieroglyphic" and "red raccoon dog hieroglyphic" appear on the color display 19 in such a manner that the "green fox hieroglyphic" and "red raccoon dog hieroglyphic" are displayed as registration password data items as shown in FIG. 7F.

In this way, when an arbitrary hieroglyphic data and its color specifying data have been set, the image data of the hieroglyphic corresponding to the data appears on the color display 19 and the hieroglyphic data and color specifying data are stored in the password edit memory 15.

Figure 7F:
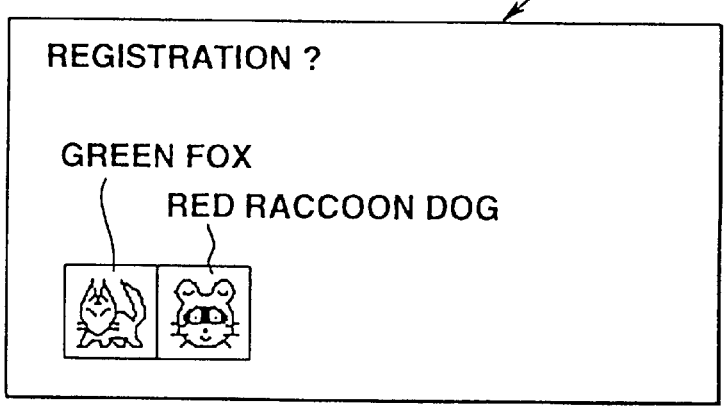
Figure 7F:
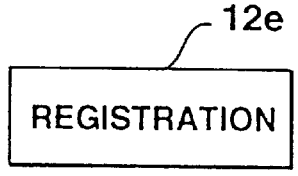

In this state, when the "registration" key 12e in the key input section 12 is operated as shown in FIG. 7F, the password registration complete flag F in the registration complete flag register 17e in the RAM 17 is set to "1" and the "password data" composed of a combination of the hieroglyphic data and color specifying data stored in the password edit memory 15 is transferred to the password storing memory 16 and is stored and registered therein (step S11→S12, S13).

<Password Collation Process>

To access the data in the secret data memory 17d in the RAM 17 (for the display, deletion, change, addition or the like of secret data), when the "secret" key 12g in the key input section 12 is operated in step S1, the contents of the password edit memory 15 are cleared and it is determined whether or not the password registration complete flag F has been set to "1" in the registration complete flag register 17e in the RAM 17, that is, whether or not the password data has been registered already in the password storing memory 16 (step S1→S2, S3).

When it is judged in step S3 that the password registration complete flag F has been set to "1," or that the password data has been registered in the password storing memory 16, "PASSWORD (hieroglyphic)?", a hieroglyphic input request message for collation password data, appears on the color display 19 as shown in FIG. 7A (step S3→S4).

Figure 8A:
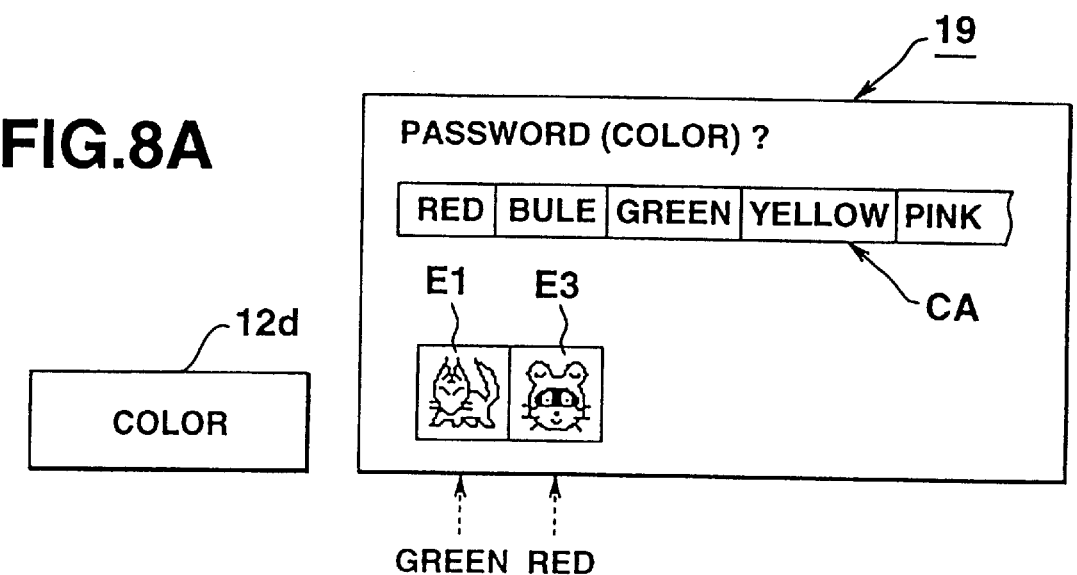
FIGS. 8A and 8B illustrate displaying states produced by the password data collation process.
Figure 8B:
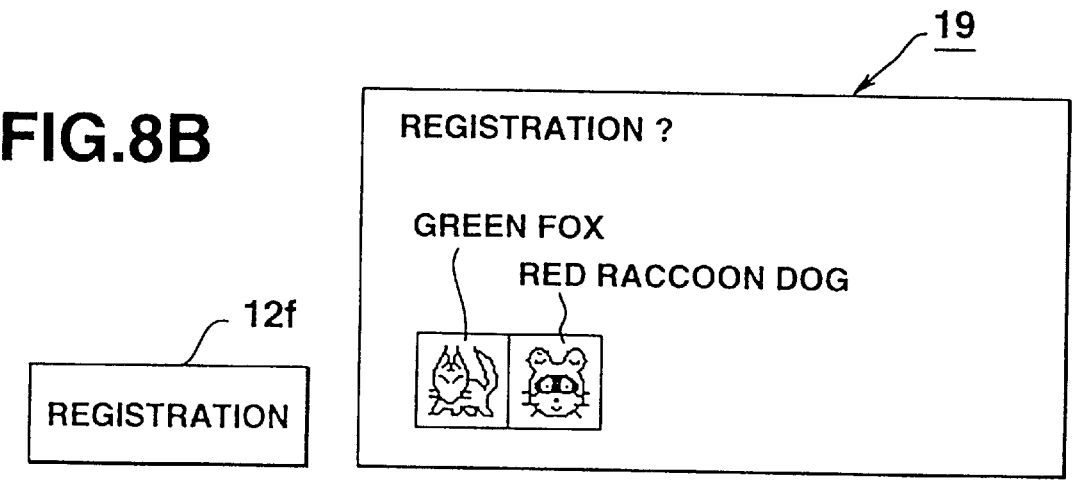

Then, as in the password setting processes in steps S5 to S19, when a hieroglyphic and its color specifying data are inputted as collation password data (see FIG. 8A), the inputted hieroglyphic appears in the color corresponding to the color specifying data on the color display 19 as shown in FIG. 8B and the hieroglyphic data and its color specifying data are stored in the password edit memory 15 (steps S15 to S19).

Then, "COLLATION?," a password data collation verify message, appears on the color display 19 (step S20).

When a specific period time has elapsed without the "collation" key 12f in the key input section 12 being operated, control returns to the processes in step S14 and later steps, a combination of the second hieroglyphic data and its color specifying data is set as collation password data (step S21→S4 to S20).

For example, in the processes of inputting collation password data in steps S14 to S21, "fox" and "green" are inputted as the first hieroglyphic and its color specifying data. After that, "raccoon dog" and "red" are inputted as the second hieroglyphic and its color specifying data, respectively. In this way, these data items are stored in the password edit memory 15. With the green fox hieroglyphic and red raccoon dog hieroglyphic appearing as the collation password data items on the color display 19 as shown in FIG. 8B, when the "collation" key 12f in the key input section 12 is operated, it is determined whether or not the collation password data stored in the password edit memory 15 coincides with the registration password data stored in the password storing memory 16 (step S21→S22).

Specifically, it is determined whether or not the "collation password data" composed of the green fox hieroglyphic data and red raccoon hieroglyphic data stored in the password edit memory 15 coincides with the "registration password data" composed of the green fox hieroglyphic data and red raccoon hieroglyphic data stored in the password storing memory 16.

Figure 9:
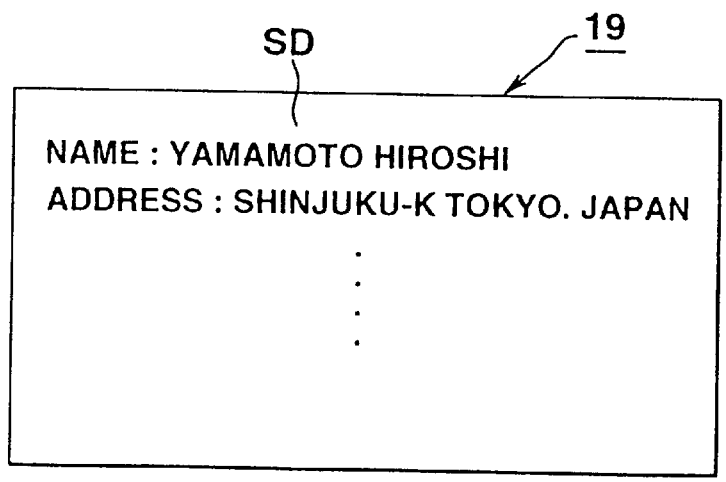
FIG. 9 illustrates an example of the secret data displayed at the time of coincidence of the individual password data items.

When it is determined that they coincide with each other, the secret data SD stored in the secret data memory 17d in the RAM 17 is read out and displayed as shown in FIG. 9. This enables the processing of the secret data, such as deletion, change, or addition (step S22→S23).

On the other hand, when the "registration password data" composed of the green fox hieroglyphic data and red raccoon dog hieroglyphic data stored in the password storing memory 16 does not coincide with the "collation password data" stored in the password edit memory 15, a message that the inputted collation password data does not coincide with the registration password data appears on the color display 19 (not shown) (step S22→S24).

As described above, with the above configuration, in the state where the secret mode has been set by operating the "secret" key 12g in the key input section 12, when the "registration password data" composed of a combination of an arbitrary hieroglyphic data item and its color specifying data item is stored in the password edit memory 15 by selectively operating the hieroglyphic key 12b, color key (red, blue, green) 12d, and the like, and then operating the "registration" key 12e, the registration password data is stored and registered in the password storing memory 16.

Thereafter, the collation password data is inputted in a similar password input process and is then stored in the password edit memory 15. Then, when the "collation" key 12f is operated and the "registration password data" stored in the password memory 16 coincides with the "collation password data" entered this time and stored in the password edit memory 15, the secret data stored in the secret data memory 17d in the RAM 17 can be accessed.

Therefore, it is possible to set a password data which is easy for the user to memorize but is difficult for others to understand. Using the password thus set, the secret data can be accessed.

While in the embodiment, the password is composed of a combination of a hieroglyphic data item and its color specifying data item, the password may be composed of a combination of another diagrammatic data item and its color specifying data, or a combination of a character data item and its color specifying data item. In this case, too, a specific user can access the secret data using a password data item which is easy for the user to memorize but is difficult for others to understand.

While in the embodiment, the color specifying data for specifying the colors appearing on the color display 19 is used as color data, the color data itself may be used.

As described until now, with the present invention, because at least one color data item or a combination of at least one color data item and at least one character data item or image data item is used as registration and collation password data, this provides a password data which is easy for the user to memorize but is difficult for others to understand. Using the password thus set, the secret data can be accessed.

When the registration and collation password data items are set, the image data of the hieroglyphic and the like is displayed in color using the color corresponding to the color data constituting the set password data, so the user can visually check for certain which color has been used as the color data for password data, seeing the color of the image data.

I claim:

1. A secret data storage device comprising:
   data storage means for storing secret data;
   first password input data means for inputting color designating data for designating a specific color and image data in correspondence with each other as registration password data;

password data storage means for storing the registration password data inputted from the first password data input means;

second password data input means for inputting color designating data for designating a specific color and image data in correspondence with each other as collation password data;

coincidence determining means for determining whether or not the collation password data inputted from the second password data input means coincides with the registration password data stored in said password data storage means; and control means for performing control so as to enable access to the secret data stored in said data storage means when the coincidence determining means has determined that the collation password data and registration password data coincide with each other.

2. A secret data storage device according to claim 1, further comprising:

specifying means for specifying any one of a plurality of hieroglyphics; and display means for providing color display of the hieroglyphic specified by the specifying means using a color corresponding to the color data inputted as said registration password data or said collation password data.

3. A method of reading stored secret data by a computer, comprising:

a first password data input step of inputting color designating data for designating a specific color and image data in correspondence with each other as registration password data;

a password data storage step of storing the registration password data inputted in the first password data input step;

a second password data input step of inputting color designating data for designating a specific color and image data in correspondence with each other as collation password data;

a coincidence determining step of determining whether or not the collation password data inputted in the second password data input step coincides with the registration password data stored in said password data storage step; and a control step of performing control so as to enable access to the secret data stored in said data storage step when the coincidence determining step has determined that the collation password data and registration password data coincide with each other.

4. A storing medium which stores a control program which performs control so as to read stored secret data on a computer, wherein said control program:

stores the inputted secret data when the user inputs the secret data;

stores the inputted registration password data for registration password when the user inputs one of a single color data item and a combination of a plurality of color data items as registration password data;

determines whether or not the inputted collation password data coincides with said stored registration password data, when the user inputs one of a single color data item and a combination of a plurality of color data items as collation password data; and performs control so as to enable access to said stored secret data, when the coincidence judging result has shown that they coincide with each other.

5. A storing medium which stores a control program that performs control so as to read stored secret data on a computer, wherein said control program:

stores the inputted secret data when the user inputs said secret data;

stores the inputted registration password data, when the user causes at least one color data item to correspond to one of at least one character data item and at least one image data item and inputs the color data item as registration password data;

determines whether or not the inputted collation password data coincides with said stored registration password data, when the user causes at least one color data item to correspond to at least one character data item or image data item and inputs the color data item as collation password data; and performs control so as to enable access to the stored secret data, when the coincidence determining result has shown that they coincide with each other.

6. Secret data storing apparatus, comprising:

data storing means which stores secret data;

hieroglyphic input means which displays a plurality of hieroglyphics and inputs at least one hieroglyphic selected by a user from among the hieroglyphics;

color data input means which inputs color data for designating a specific color to the hieroglyphic inputted by the hieroglyphic input means;

password data registration means which registers the hieroglyphic data inputted by the hieroglyphic input means and the color data inputted by the color data input means as password data;

password input means for inputting the hieroglyphic data and the color data by the user;

determination means for determining whether the hieroglyphic data and the color data inputted by the password input means correspond to the hieroglyphic data and the color data registered by the password data registration means; and control means for reading out the secret data stored in the storing means when the determination means determines correspondence between the inputted hieroglyphic data and color data and the registered hieroglyphic and color data.

7. A secret data storage device according to claim 6, further comprising:

display means for displaying the hieroglyphic inputted by the hieroglyphic input means with a color corresponding to the color data inputted by the color data input means.

8. A secret data readout method for reading out stored secret data by means of a computer, comprising the steps of:

displaying a plurality of hieroglyphics and inputting at least one hieroglyphic selected by a user from among the hieroglyphics;

inputting color data for designating a specific color to the hieroglyphic inputted in the hieroglyphic input step;

registering the hieroglyphic inputted in the hieroglyphic input step and the color data inputted in the color data input step as password data;

inputting hieroglyphic and color data by the user as a password when the secret data is to be read out;

determining whether the hieroglyphic and the color data inputted in the password inputting step correspond to the hieroglyphic and the color data registered in the password data registration step; and reading out the stored secret data when correspondence between the passwords is determined in the determining step.

9. A control program storing medium in which there is stored a control program for reading out stored secret data by a computer, the control program comprising:

instruction for displaying a plurality of hieroglyphics and inputting at least one hieroglyphic selected by a user from among the hieroglyphics;

instruction for inputting color data for designating a specific color to the hieroglyphic inputted in accordance with the hieroglyphic input instruction;

instruction for registering the hieroglyphic inputted in accordance with the hieroglyphic input instruction and the color data inputted in accordance with the color data input instruction as password data;

instruction for inputting hieroglyphic and color data by the user when the secret data is to be read out;

instruction for determining whether the hieroglyphic and the color data inputted in accordance with the password input instruction correspond to the hieroglyphic and the color data registered in accordance with the password data registration instruction; and instruction for reading out the stored secret data when correspondence between the passwords is determined.

10. A control program storing medium in which there is stored a control program for reading out stored secret data by a computer, the control program comprising:

first password data input instruction for inputting color data for designating a specific color and image data in correspondence with each other as registration password data;

password data storing instruction for storing the registration password data which is inputted in accordance with the first password data input instruction;

second password data input instruction for inputting color data for designating a specific color and image data in correspondence with each other as collation password data;

coincident determination instruction for determining whether the collation password data inputted in accordance with the second password data input instruction coincides with the registration password data which is stored in accordance with the password data storing instruction; and control instruction for enabling the stored secret data to be read out when coincidence between the collation password data and the registration password data is determined.

* * * * *